Feb. 28, 1956   J. B. BOCKELMANN ET AL   2,736,191
DEVICE FOR DETERMINING VOLUME OF GAS IN LIQUID
Filed Oct. 22, 1954

INVENTORS
JOHN B. BOCKELMANN
CHARLES HANFT

BY *Wenderoth, Lind & Ponack*
ATTORNEYS

United States Patent Office 2,736,191
Patented Feb. 28, 1956

2,736,191

DEVICE FOR DETERMINING VOLUME OF GAS IN LIQUID

John B. Bockelmann, Tenafly, N. J., and Charles Hanft, Hicksville, N. Y., assignors to The F. & M. Schaefer Brewing Co., Brooklyn, N. Y.

Application October 22, 1954, Serial No. 464,002

7 Claims. (Cl. 73—19)

This invention relates to a device and method of determining the gas content of gas-liquid solutions and is more particularly adapted to a simplified structure and method for determining the percentage of $CO_2$ in beer.

A principal object of the invention is to provide a construction wherein a single gauge allows the rapid reading of numerous samples of a liquid giving the direct reading in volumes of the dissolved gas and thereby eliminating the use of empirical tables as at present, so that a source of human error is eliminated and the procedure simplified.

A further object of the invention is to provide a structure of corrosion-resistant metal or the like which is sturdy, durable and portable that can be easily sterilized and cleaned and which is capable of withstanding rough handling without affecting its high accuracy.

A further object of the invention is to provide a temperature compensating pressure gauge designed particularly so that unskilled labor may be utilized in testing without the necessity of correlating temperature and pressure readings with empirical charts.

With the above and other objects which will appear from the more detailed description set forth below, it being understood that such detailed description is given by way of illustration and explanation only and not by way of limitation, since various changes therein may be made by those skilled in the art without departing from the spirit and scope of the present invention as set forth in the claims.

In connection with that more detailed description reference is made to the drawings, in which Figure 1 is a front elevational view of the improved testing device with parts broken away at both ends;

In the various figures like reference characters indicate like parts.

Figure 1:
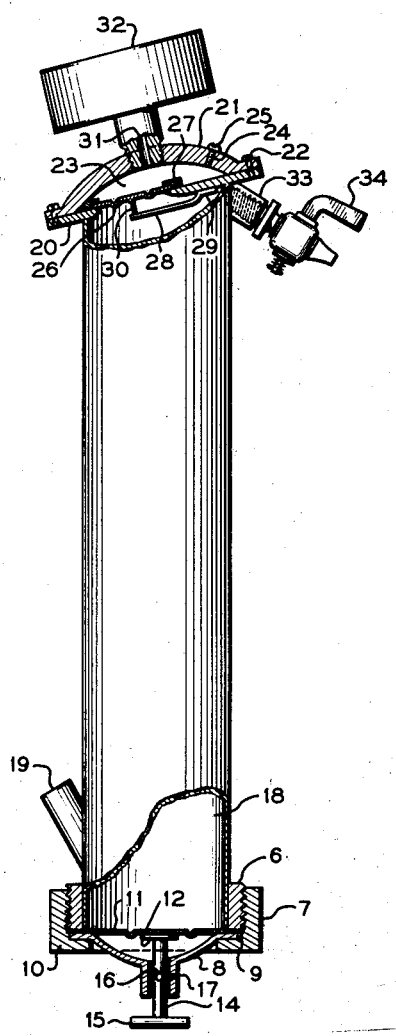

In the figures the testing device comprises an elongated cylinder 5 constructed of copper or other corrosion resistant metal or the like provided at its lower end with a threaded ring 6 with which an interiorly threaded cup shaped member 7 cooperates in order to clamp a lower dish shaped head 8 to the bottom of the cylinder 5 in air tight condition. The dish shaped head 8 is provided with a peripheral flange 9 which is clamped between the threaded collar 6 and the lower flange 10 of the cup shaped member 7.

Also clamped between the members 6 and 7 is a flexible inert impervious diaphragm 11, preferably constructed of rubber or synthetic rubber which is inert, physically and chemically with respect to the liquid sample to be tested. Gum rubber is particularly suitable. The diaphragm 11 is of sufficient thickness and is suitably dimensioned with respect to its thickness and its upper planar surface to provide a constant volume when locked in what may be called its neutral position as shown in Figure 1 which will provide a constant volume for the samples to be tested reproducible during constant usage of the device both rapidly and exactly.

The diaphragm 11 is secured in any desired manner to a plate 12 which in turn is fixed to a push rod 14 provided with an operating handle 15. The rod 14 is provided with a transversely extending pin 16 which in turn cooperates with a bayonet slot 17 as more particularly shown in our co-pending application filed concurrently with the present application. The operation of the diaphragm 11 is the same as set forth in our concurrently filed application.

The space in the instrument which is filled with the liquid to be tested is indicated at 18 and the inlet port to such space is shown generally at 19 and may be of any desired type. The structure of the inlet petcock may be the same as that shown in U. S. Patent No. 2,102,105, granted December 14, 1937, to Edward Zahm.

At the upper and opposite end of the cylinder or metal shell 5 there is provided a plate 20 secured to the cylinder 5 in any desired way such as by welding or a threaded connection. Secured to the plate 20 by bolts 22 is a dish shaped head or metal dome 21 defining with the plate 20 a compartment 23 which is filled with a liquid, preferably water, by means of the aperture 24 closed by the threaded bolt 25.

The plate 20 is provided with an opening in which is fixed a diaphragm 26 preferably of rubber although other material may be used, by means of the grooved elements 27 which are secured both to the plate 20 and to the diaphragm 26 in any desired manner so as to maintain the compartment 23 isolated from the chamber 18 in a fluid tight manner so that the beverage being tested cannot reach the bourdon spring of the pressure gauge 32.

Figure 2:
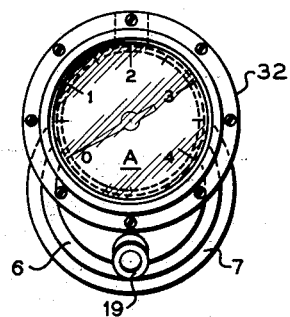
Figure 2 is a top view.
Figure 3:
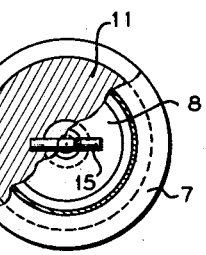
Figure 3 is a bottom view with a portion broken away.

At the underside of the plate 20 there is mounted a bi-metallic strip 28 at its end 29. The free end of such bi-metallic temperature responsive element 28 is secured by a pin 30 to the diaphragm 26 so that any variations in temperature of the sample tested will be immediately compensated for in the pressure prevailing in the compartment 23 and in the entire system above the diaphragm 26. Communicating with the compartment 23 by the duct 31 in which the pressure liquid also extends is a pressure gauge 32 as shown more particularly in Figure 2 which is directly calibrated in volumes of gas so that it is not necessary to refer to any empirical charts.

At the upper end of the cylinder 5 there is provided an interiorly threaded outlet boss 33 which is preferably provided with a petcock 34 which is used to purge or bleed the chamber 18 during the preliminary preparation for a test. As shown in Figure 1 the plate 20 is located at an inclination to the longitudinal axis of the container or cylinder and the outlet means 33 and 34 is located adjacent the plate 20 at the longest length of the testing chamber 18 in order to facilitate the bleeding of entrapped air through the outlet means.

In the operation of the device the cylinder 5 is first purged with the liquid to be tested by passing liquid through the inlet 19 and then through the petcock 34 until it is determined that the temperature is stabilized and any air pockets removed which takes place in a short time. The petcock 34 is then closed while the diaphragm 11 is maintained in its neutral position as shown in Figure 1. Then the inlet 19 is closed and the cylinder shaken. The diaphragm 11 is then released by removing the pin 16 from the bayonet slot 17 and the diaphragm 11 is allowed to distend fully to the position where it follows the inner contour of the head 8. The gauge 32 because of the temperature compensating feature and the calibration provided will then give its reading directly in volumes as to the gas content.

The advantages of the device described above resides in the fact that no venting or bleeding is required wherein the volume of liquid is reduced a certain percentage to a visual mark which may cause errors and also there is no necessity for referring separate temperature and pressure readings of the gas content to empirical charts for determining the gas content. The actual gas content is given directly upon the gauge 32 and such is within about a 3% error.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

We claim:

1. A device for directly determining the gas content of a liquid containing a gas in solution comprising a container having a testing chamber and a pressure chamber, inlet and outlet means in said testing chamber, means for establishing a specific ratio between the volume of liquid in said testing chamber to be tested and the volume of said testing chamber, a plate secured to said container having an opening therein dividing said container into said two chambers, a diaphragm extending over said opening thereby sealing said chambers from one another, a bi-metallic strip secured on said plate having a free end movable responsive to temperature changes within said testing chamber containing the liquid to be tested, a pressure gauge mounted on said container having a hydraulic connection through said pressure chamber with said diaphragm and a connection between the free end of said strip and said diaphragm so that said pressure gauge gives a pressure reading modified by the temperature changes in said testing chamber containing the liquid to be tested.

2. A device for directly determining the gas content of a liquid containing a gas in solution comprising a container having a testing chamber and a pressure chamber, inlet and outlet means in said testing chamber, means for establishing a specific ratio between the volume of liquid in said testing chamber to be tested and the volume of said testing chamber, a plate secured to said container having an opening therein dividing said container into said two chambers, a diaphragm extending over said opening thereby sealing said chambers from one another, a bi-metallic strip secured on said plate having a free end movable responsive to temperature changes within said testing chamber containing the liquid to be tested, a pressure gauge mounted on said container having a hydraulic connection through said pressure chamber with said diaphragm and a connection between the free end of said strip and said diaphragm so that said pressure gauge gives a pressure reading modified by the temperature changes in said testing chamber containing the liquid to be tested and said gauge being calibrated in gas volumes.

3. A device as set forth in claim 1 wherein said means for establishing a specific ratio comprises collapsible means mounted in said testing chamber containing the liquid to be tested at the end opposite said diaphragm.

4. A device for directly determining the gas content of a liquid containing a gas in solution comprising a container having a testing chamber and a pressure chamber, inlet and outlet means in said testing chamber, means for establishing a specific ratio between the volume of liquid in said testing chamber to be tested and the volume of said testing chamber, a diaphragm sealing said chambers from one another, a bi-metallic strip secured on said container having a free end movable responsive to temperature changes within said testing chamber containing the liquid to be tested, a pressure gauge mounted on said container having a hydraulic connection through said pressure chamber with said diaphragm and a connection between the free end of said strip and said diaphragm so that said pressure gauge gives a pressure reading modified by the temperature changes in said testing chamber containing the liquid to be tested.

5. A device for directly determining the gas content of a liquid containing a gas in solution comprising a container having a testing chamber and a pressure chamber, inlet and outlet means in said testing chamber, means for establishing a specific ratio between the volume of liquid in said testing chamber to be tested and the volume of said testing chamber, a diaphragm sealing said chambers from one another, a bi-metallic strip secured on said container having a free end movable responsive to temperature changes within said testing chamber containing the liquid to be tested, a pressure gauge mounted on said container having a hydraulic connection through said pressure chamber with said diaphragm and a connection between the free end of said strip and said diaphragm so that said pressure gauge gives a pressure reading modified by the temperature changes in said testing chamber containing the liquid to be tested and said gauge being calibrated in gas volumes.

6. A device as set forth in claim 1 wherein said plate is disposed at an inclination to the longitudinal axis of said container and said outlet means is located adjacent said plate at the longest length of said testing chamber to facilitate the bleeding of entrapped air through said outlet means.

7. A device as set forth in claim 4 wherein said plate is disposed at an inclination to the longitudinal axis of said container and said outlet means is located adjacent said plate at the longest length of said testing chamber to facilitate the bleeding of entrapped air through said outlet means.

References Cited in the file of this patent

UNITED STATES PATENTS

| | | |
|---|---|---|
| 1,559,063 | Becker | Oct. 27, 1925 |
| 2,072,915 | Wallach | Mar. 9, 1937 |
| 2,102,105 | Zahm | Dec. 14, 1937 |
| 2,239,221 | Dimmock | Apr. 22, 1941 |
| 2,603,086 | Ingham, Jr., et al. | July 15, 1952 |